(12) United States Patent
Zammit et al.

(10) Patent No.: US 12,271,759 B2
(45) Date of Patent: Apr. 8, 2025

(54) PREDICTION MODEL FOR DETERMINING DECISION THRESHOLDS

(71) Applicant: PayPal, Inc., San Jose, CA (US)

(72) Inventors: Alban Axel Zammit, Stanford, CA (US); Wei Xu, San Jose, CA (US); Yanzan Zhou, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 633 days.

(21) Appl. No.: 17/645,696

(22) Filed: Dec. 22, 2021

(65) Prior Publication Data

US 2023/0195525 A1 Jun. 22, 2023

(51) Int. Cl.
*G06F 9/50* (2006.01)
*G06F 16/23* (2019.01)

(52) U.S. Cl.
CPC .......... *G06F 9/5044* (2013.01); *G06F 9/5055* (2013.01); *G06F 16/23* (2019.01)

(58) Field of Classification Search
None
See application file for complete search history.

(56) References Cited

U.S. PATENT DOCUMENTS

| | | | |
|---|---|---|---|
| 1,077,089 A | 10/1915 | McCarthy | |
| 8,875,150 B2 | 10/2014 | Ferdous et al. | |
| 9,898,779 B2 | 2/2018 | Haggerty et al. | |
| 10,579,494 B2 | 3/2020 | Schmidt et al. | |
| 11,537,439 B1 * | 12/2022 | Liberty | G06F 9/5077 |
| 2016/0004985 A1 * | 1/2016 | Blomberg | G06Q 10/06313 705/342 |
| 2017/0004201 A1 * | 1/2017 | Snell | G06F 16/24534 |
| 2017/0083822 A1 * | 3/2017 | Adendorff | G06F 11/0793 |
| 2020/0174842 A1 * | 6/2020 | Wang | H04L 67/63 |
| 2023/0008176 A1 * | 1/2023 | Sedaghat | G06F 9/5038 |

* cited by examiner

*Primary Examiner* — Adam Lee
(74) *Attorney, Agent, or Firm* — Kowert, Hood, Munyon, Rankin & Goetzel, P.C.; Scott W. Pape; Dean M. Munyon

(57) ABSTRACT

Disclosed methods include maintaining a database of resource limits for a plurality of agents. A resource limit may be usable for predicting a result of a given request from a given agent. Maintaining the database may include determining an updated resource limit for a particular agent based on identifying an extrema point of a function of resource limit. The maintaining may further include updating the database using the updated resource limit, as well as selecting, from the database, a subset of the plurality of agents that are selected based on associated parameter values compared to parameter values associated with the particular agent. The maintaining may also include updating corresponding resource limits for the subset of the plurality of agents based on the updated resource limit. The method may further include receiving a request from the particular agent, and predicting, using the updated resource limit, a result of the request.

20 Claims, 8 Drawing Sheets

System 100

Chart 300
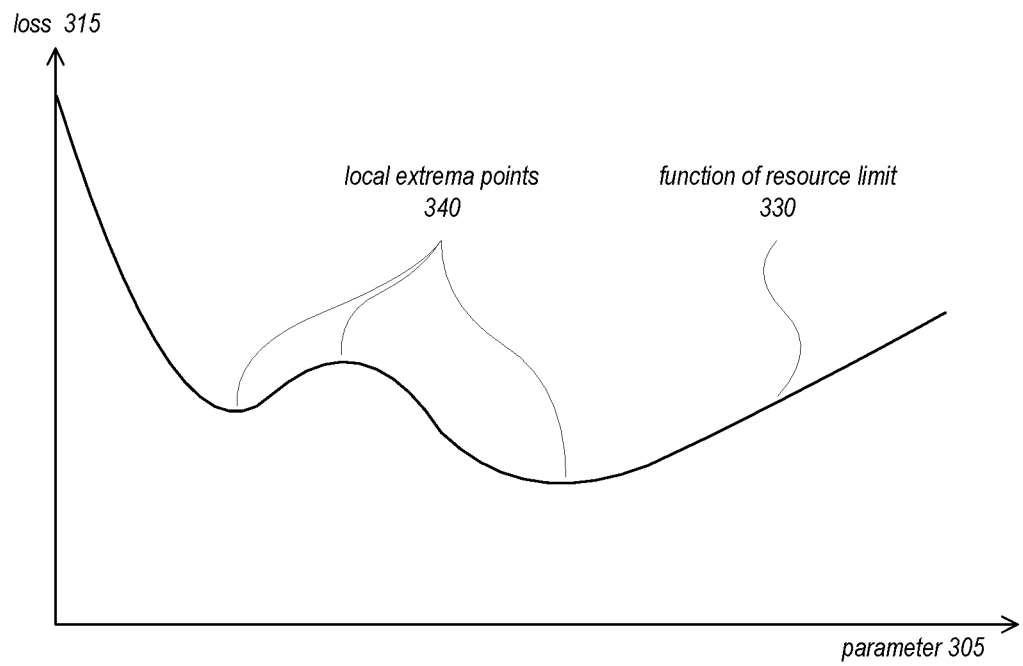
Chart 350
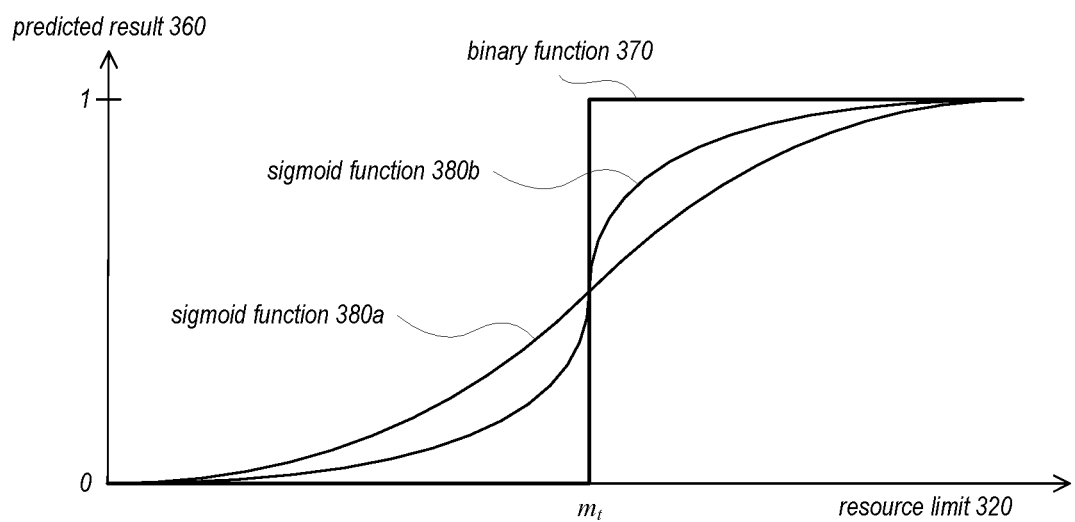
FIG. 3

*Flow diagram 400*

500

*Maintaining, by a computer system, a database of resource limits for a plurality of agents, wherein a corresponding resource limit for a given agent is usable for predicting a result of a given request from the given agent.*
510

*Receiving, by the computer system, a request from the particular agent.*
520

*Predicting, using the updated resource limit from the database, a result of the request.*
530

```
┌─────────────────────────────────────────────────────────┐
│ Determining, by a computer system over a set of         │
│ completed requests for a particular agent, an extrema   │
│ point of a function of resource limit to determine an   │
│ updated resource limit for the particular agent,        │
│ wherein the function is based on a current resource     │
│ limit for the particular agent and current state of     │
│ active requests for the particular agent.               │
│                          610                            │
└─────────────────────────────────────────────────────────┘
                             │
                             ▼
┌─────────────────────────────────────────────────────────┐
│ Updating, by the computer system, the database using    │
│ the updated resource limit.                             │
│                          620                            │
└─────────────────────────────────────────────────────────┘
                             │
                             ▼
┌─────────────────────────────────────────────────────────┐
│ Selecting, by the computer system from the database,    │
│ a subset of the plurality of agents, wherein selected   │
│ agents have associated parameter values that are        │
│ within a particular delta of parameter values           │
│ associated with the particular agent.                   │
│                          630                            │
└─────────────────────────────────────────────────────────┘
                             │
                             ▼
┌─────────────────────────────────────────────────────────┐
│ Updating, in the database, corresponding criteria       │
│ values for the subset of the plurality of agents based  │
│ on the updated resource limit.                          │
│                          640                            │
└─────────────────────────────────────────────────────────┘
```

```
┌─────────────────────────────────────────────────────────────────┐
│ Maintaining, by a computer system, a database of resource       │
│ limits for a plurality of agents, wherein a corresponding       │
│ resource limit for a given agent is usable for predicting a     │
│ result of a given request from the given agent.                 │
│ 710                                                             │
└─────────────────────────────────────────────────────────────────┘
                                │
                                ▼
┌─────────────────────────────────────────────────────────────────┐
│ Using, by the computer system, a function of resource limit to  │
│ determine respective resource limits that are stored in the     │
│ database, wherein the using includes:                           │
│ 720                                                             │
│  ┌───────────────────────────────────────────────────────────┐  │
│  │ Performing a gradient descent operation to identify, over │  │
│  │ a set of completed requests and active requests for a     │  │
│  │ particular agent of the plurality of agents, an extrema   │  │
│  │ point of the function of resource limit.                  │  │
│  │ 724                                                       │  │
│  └───────────────────────────────────────────────────────────┘  │
│                              │                                  │
│                              ▼                                  │
│  ┌───────────────────────────────────────────────────────────┐  │
│  │ Determining, based on the extrema point, an adjustment    │  │
│  │ to a particular resource limit for the particular agent.  │  │
│  │ 727                                                       │  │
│  └───────────────────────────────────────────────────────────┘  │
└─────────────────────────────────────────────────────────────────┘
                                │
                                ▼
┌─────────────────────────────────────────────────────────────────┐
│ Predicting, by the computer system using the adjusted           │
│ particular resource limit from the database, a result of a      │
│ request received from the particular agent.                     │
│ 730                                                             │
└─────────────────────────────────────────────────────────────────┘
```

FIG. 7

PREDICTION MODEL FOR DETERMINING DECISION THRESHOLDS

BACKGROUND

Technical Field

This disclosure relates generally to prediction models, and more particularly to techniques for determining threshold values used to predict outcomes of requested exchanges.

Description of the Related Art

Various types of information exchanges are performed by computer systems every day. As used herein, an "information exchange" is a computer operation that includes updating information in a computer system along with related work, i.e., a transaction. In many cases, these transactions are considered to be indivisible, and succeed or fail as a complete unit. In many cases, an information exchange involves two entities. For example, a first agent may request that a second agent update the first agent's record in a database. Similarly, a first agent (e.g., a first user of a service) may request an information exchange with a second agent (e.g., a second user of the service) that results in information being exchanged between the agents or within the service. An information exchange may, in some cases, also result in the exchange of physical or electronic goods/services. "Agents," as used herein, are various entities that may send and/or receive items related to an information exchange. In various embodiments, an agent may be a person, business, computer system, circuitry within an integrated circuit, and the like. The items being exchanged may be physical goods, information, streaming media, funds, and the like, as well as combinations thereof. In some information exchanges, a first entity may fulfil a first portion of the information exchange before a second entity fulfils a second portion. Such information exchanges may require an element of trust that the second entity will fulfil their portion of the exchange. Establishing trust for a particular entity may include analyzing past activity of the particular entity. If, however, the particular entity does not have sufficient prior activity to analyze, then establishing a threshold for trust may be difficult. Techniques for predicting an outcome of an information exchange requested by a given entity may, therefore, be desired.

BRIEF DESCRIPTION OF THE DRAWINGS

FIG. 3 depicts two charts, including a chart illustrating a function of resource limit and a chart showing prediction results versus resource limits represented as a binary function and two sigmoid functions.

FIG. 5 shows a flow diagram of an embodiment of a method for predicting a result of a request made by an agent.

FIG. 6 depicts a flow diagram of an embodiment of a method for updating resource limits for corresponding agents maintained in a database.

FIG. 7 illustrates a flow diagram of another embodiment of a method for predicting a result of a request made by an agent.

DETAILED DESCRIPTION

When an information exchange is made in which portions of the information exchange occur at different points in time, a particular agent may be liable in the event a latter portion of the exchange is not fulfilled to the satisfaction of the receiving entity. In some information exchanges, a processing service may be used to mitigate risks involved in the fulfillment of the exchanges. For example, a streaming media service may provide content to a particular entity in response to a request received from a device associated with the particular entity. The entity is expected to fulfil their portion of the information exchange (e.g., compensation for streaming the content) by a particular date after the media is streamed. A processing service may be used to protect the information exchange by assuming responsibility for the entity completing their portion of the information exchange after the media service has already completed their portion. At the time the information exchange request is accepted, the processing service would benefit from a robust and fast model to anticipate potential issues with the entity completing the information exchange.

The present disclosure recognizes that a robust and fast model to anticipate potential issues with agents may be implemented by determining a resource limit for respective agents and storing it into a database. When an agent requests an information exchange, a processing service may use the stored resource limit to predict a result of the requested exchange, and determine whether the request should be approved. A request history of each agent may be used to determine the respective resource limit for each agent. A function of resource limit is used to determine each resource limit based on identification of a local extrema point. In various embodiments, the extrema point may be a local maxima or a local minima based on what the function represents. For example, higher values generated by the function may indicate a potential for failure of a given request, in which case a local minima may be identified to minimize risk of failure.

A current method for determining whether to approve requested information exchanges may include a tree-based method relying on different levels of clusters of agents in which a particular resource limit is manually set for each cluster of agents. The disclosed technique is automated and individualized to generate a resource limit for each agent. Accordingly, an accuracy of outcome predictions may increase due to the individualized resource limits. In addition, an automated technique for updating the resource limits may further improve this accuracy as more requested information exchanges are processed, providing more data for updating the resource limits.

Figure 1:
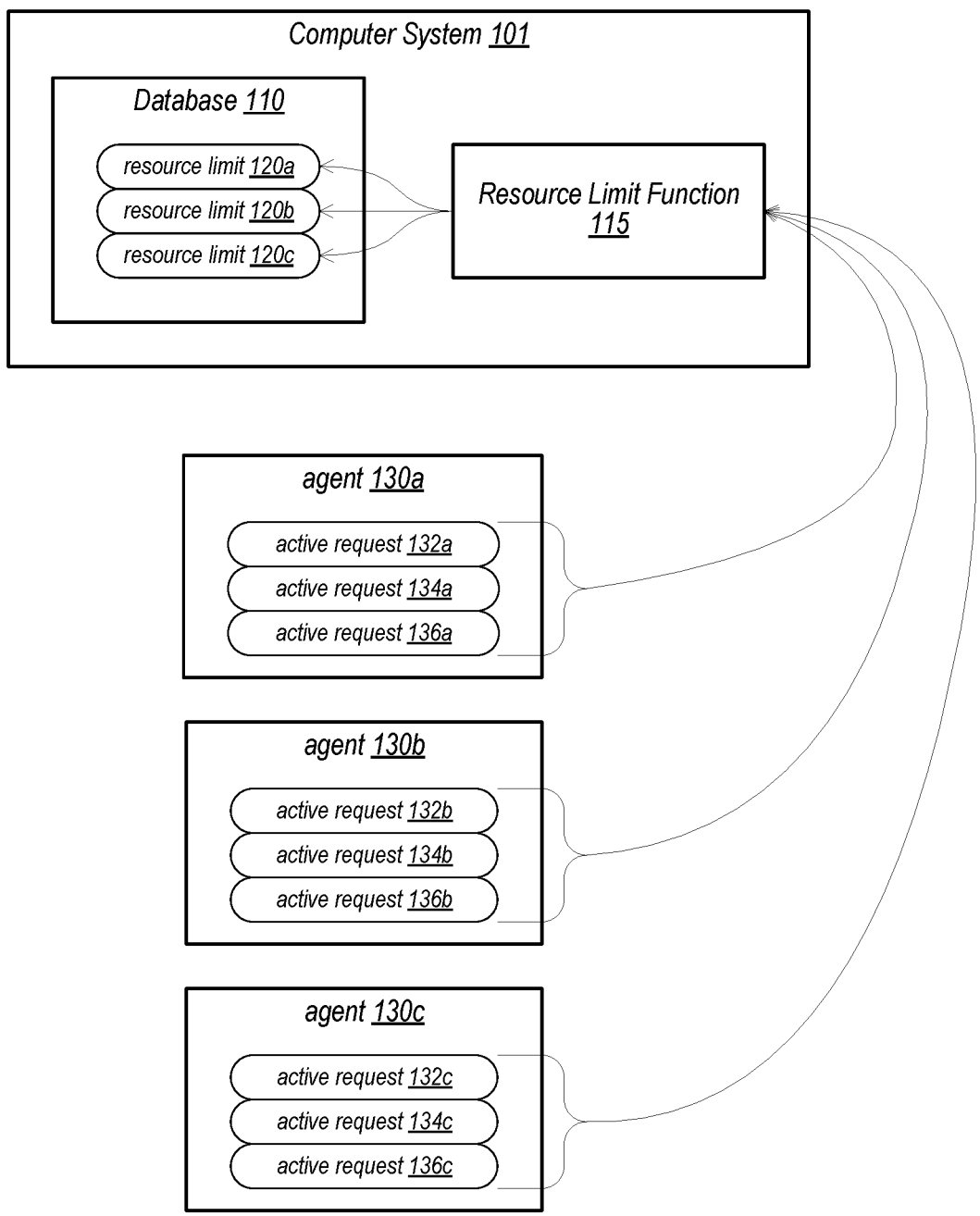
FIG. 1 is a block diagram illustrating an embodiment of a system for analyzing information associated with requests made by a plurality of agents.

A block diagram of an embodiment of a system that may be used to implement the disclosed techniques is illustrated in FIG. 1. As illustrated, system 100 includes computer system 101, further including database 110, and agents 130a-130c (collectively agents 130). Computer system 101 uses resource limit function 115 to generate resource limits 120a-120c (collectively 120) based on active requests 132a-132c, 134a-134c, and 136a-136c, associated with respective ones of agents 130.

Computer system 101, as shown, is implemented as any suitable type of computer system, including, for example, one or more server computers hosting an online service such as an exchange processing system. In other embodiments, computer system 101 may be a desktop computer, a laptop computer, a tablet computer, a smart phone, and the like. Agents 130 may, in some embodiments, be other computer systems operated by respective users. In other embodiments, agents 130 may be peripherals or other circuits coupled to, or included in, computer system 101. For example, in an embodiment, agents 130 may be a graphics processor, network processor, and memory storage circuits, respectively. In such an embodiment, information exchanges may correspond to memory requests that are approved or denied, by computer system 101, based on amounts and/or locations of requested data, as well as, for example, a quality of service associated the request, a number of credits the requesting agent of agents 130 has, and a reliability of a communication path between a requesting agent and another agent of agents 130 providing a response to the request. In other embodiments, computer system 101 may enable online information exchanges between two or more agents of agents 130. Any suitable items may be included in the enabled exchanges, such as goods, services, media, data, money, and the like. For example, computer system 101 may act as a processing system for various agents exchanging items online.

To approve or decline various requests, computer system 101 maintains database 110 of resource limits 120 for agents 130. A corresponding resource limit 120 for a given agent of agents 130 is usable for predicting a result of a request from the given agent of agents 130. Based on this prediction, computer system 101 may approve the request if the predicted result satisfies a particular threshold (e.g. results in a positive outcome), and may decline the request if the threshold is not met (e.g., the predicted outcome is a net negative value). Requests being predicted include requests for various types of information exchanges, such as those described above.

As illustrated, maintaining database 110 includes identifying, over a set of completed requests for a particular agent of agents 130, a local extrema point of resource limit function 115. Resource limit function 115 is a function of resource limit that produces a value that is associated with an outcome of a given request. As will be described in more detail below, the extrema point refers to a value of the function for a particular set of inputs in which any incremental change (either an increase or a decrease) to any one or more of the set of inputs results in a value of the output decreasing (a maxima point) or increasing (a minima point). Once determined, respective resource limits 120 are stored in database 110, referenced to the corresponding agent of agents 130.

As shown, resource limit function 115 is based on current state of active requests for a particular one agent of agents 130. For example, for agent 130a, resource limit function 115 utilizes values associated with active requests 132a, 134a, and 136a. These active requests may include requests to perform respective information exchanges with a second agent or other entity. The active requests may include information such as an amount of bytes in requested documentation or media, a purchase amount, a total allotment (e.g., a bandwidth limit for transferred byte), a timeframe for completing the request, and the like. In some embodiments, resource limit function 115 is further based on respective penalties associated with a plurality of features associated with the particular agent of agents 130. In embodiments in which agents 130 are devices, then penalties may correspond to response times and/or quality-of-service connections between respective agents of agents 130 and other computer systems. In other embodiments, agents 130 may include users and various penalties may include information regarding respective users, such as location (e.g., home address), occupation, age, credit score, and the like. When an extrema point is determined for a particular agents of agents 130, computer system 101 may include these penalties in resource limit function 115. In some embodiments, weights may further be assigned to a plurality of the respective penalties, such that various penalties may have a strong or a weak correlation to the determination of the resulting extrema point.

As information exchanges are performed over time by various ones of agents 130, computer system 101 may be configured to determine an updated resource limit 120 for a particular agent of agents 130 based on identifying, over a set of completed requests for the particular agent of agents 130, a new extrema point of resource limit function 115. Based on the new extrema point, computer system 101 may make an adjustment to a respective resource limit 120. For example, computer system 101 may identify the new extrema point for agent 130a after a particular amount of time has elapsed since corresponding resource limit 120a was last generated or updated. As shown, computer system 101 is further configured to update database 110 using updated resource limit 120a. After resource limit 120a is updated, computer system 101 stores the updated resource limit 120a, e.g., in place of the previous value.

After updating resource limit 120a, computer system 101 is further configured to select, from database 110, a subset of the plurality of agents 130. As illustrated, computer system 101 may use, in addition to current states of active requests and penalties associated with a respective agent of agents 130, resource limits 120 for other agents when determining a resource limit 120 of a particular agent of agents 130. Accordingly, after updating resource limit 120a for agent 130a, computer system 101 may select agents 130b and/or agent 130c in order to update their respective resource limits 120b and 120c. In some embodiments, this updating of resource limits 120 may be performed periodically, while in other embodiments, the updating may be performed in response to the update to resource limit 120a. Selected ones of agents 130 may have associated parameter values that are within a particular delta of parameter values associated with agent 130a. Computer system 101 may be configured to compare associated parameter values of the other one of agents 130 to corresponding parameter values associated with agent 130a. The parameter values that are compared may be the same as the features used to determine penalties as described above.

In some embodiments, the determination of a new value of resource limit 120a may be made in parallel with new values of other ones of resource limits 120. For example, the current states of active requests and penalties associated with various ones of agents 130 may be included in calculations, performed in a simultaneous or overlapping manner, to determine updated values for the respective resource limits 120 of the various ones of agents 130.

As illustrated, computer system 101 is configured to update, in database 110, corresponding resource limits 120 for the subset of agents 130 based on updated resource limit 120a. The parameter values may be used to determine a degree of similarity between agent 130a and the other agents 130b and 130c. Based on this determined degree of similarity, agent 130b, 130c, both or neither may be selected as part of the subset. Corresponding resource limits 120*b* and/or 120*c* may be adjusted based on updated resource limit 120*a*. The determined degree of similarity may also be used to weight how much changes in updated resource limit 120*a* impact changes to the corresponding resource limits 120*b* and 120*c*. For example, if computer system 101 determines a high degree of similarity between agent 130*a* and 130*b*, then an updated value of resource limit 120*b* may be weighted to have a similar change as resource limit 120*a*. In contrast, if computer system 101 determines a low degree of similarity between agent 130*a* and 130*c*, then an updated value of resource limit 120*c* may be weighted to have little to no change regardless of how much resource limit 120*a* was changed.

After updates have been made to resource limits 120 in database 110, computer system 101 is configured to receive a request from agent 130*a*. The request from agent 130*a* may, in various embodiments, be a request to perform a memory exchange from a processing circuit coupled to, or included in, computer system 101. In other embodiments, agent 130*a* may be a user of a client computer system and the request may be for an exchange of information or goods between agent 130*a* and a different entity. Computer system 101 either approves or denies the request based on an estimation of an ability of an agent of agents 130 to fulfil conditions of the requested information exchange. To make the estimation, computer system 101 predicts, using updated resource limit 120*a* from database 110, a result of the request. For example, computer system 101 may utilize a model for predicting outcomes of similar information exchanges. This model produces a prediction for agent 130*a* based on resource limit 120*a*.

By using a tree-based method relying on different levels of clusters of agents in which a particular resource limit is manually set for each cluster of agents, success of requested information exchanges may be predicted with greater accuracy than relying on either limited data associated with a single agent or on predetermined groups of agents. Such a technique may be automated to generate a respective resource limit for each agent, thereby increasing an accuracy of outcome predictions as compared to other techniques. Automating such a technique may also improve accuracy by providing more data for updating the resource limits than a manual technique.

It is noted that the embodiment of FIG. 1 is merely an example. Features of the system have been simplified for clarity. In other embodiments, additional elements may be included, such as networking circuits to couple computer system 101 and agents 130. As described, in some embodiments agents 130 may be included in computer system 101. For clarity, a limited number of agents, resource limits, and active requests are illustrated.

Figure 2:
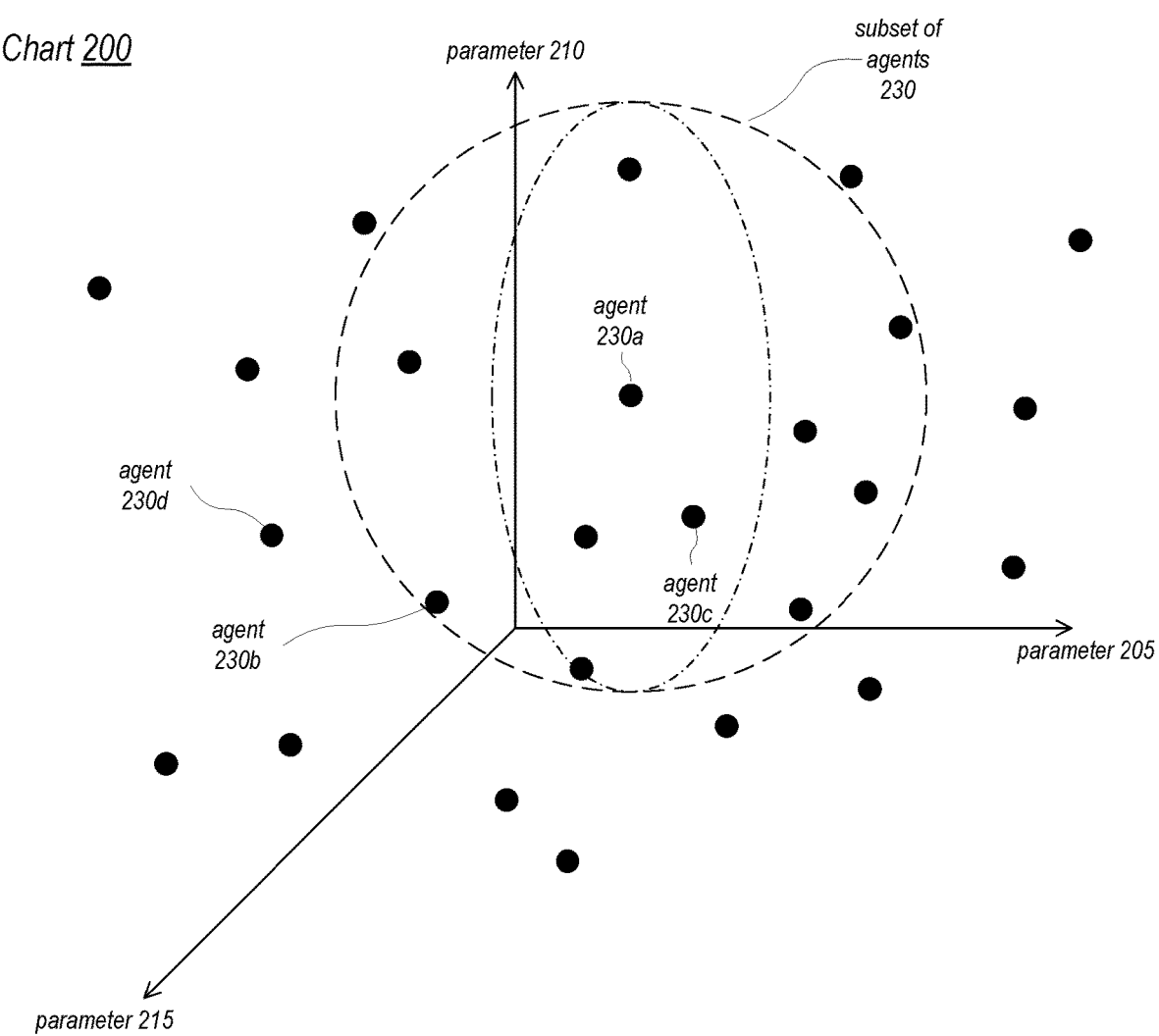
FIG. 2 shows a three dimensional chart depicting sets of parameter values associated with respective ones of a plurality of agents.

As disclosed in FIG. 1, a technique is described that includes identifying other agents based on similarities between respective parameter values. In FIG. 2, a graph illustrating a relationship between parameters for different agents is depicted.

Moving to FIG. 2, a chart depicting parameter values for a plurality of agents is illustrated. Chart 200 is illustrated as a three-axis chart with one parameter represented by each axis. Each dot in chart 200 represents a set of the three parameter values for a given one of a plurality of agents 230. For clarity, each parameter set in chart 200 includes three parameter values. In other embodiments, however, any suitable number of parameters may be included in each parameter set.

As described above, a resource limit for a given agent (agent 230*a*) may be updated (e.g., by computer system 101) based on a variety of inputs, including, for example, parameters 205, 210, and 215. Computer system 101 is further configured to select from database 110, a subset of remaining ones of the plurality of agents by selecting subset of agents 230 from the plurality based on a comparison of associated parameter values (e.g., parameter value sets including parameters 205, 210, and 215) to parameter values associated with agent 230*a*. As shown, subset of agents 230 includes agents 230 whose parameter sets fall within a particular distance from the parameter set of agent 230*a*, as represented by the dashed circles. As previously disclosed, in some embodiments a resource limit may be determined for agent 230*a* first and then for other ones of agents 230 while, in other embodiments, resource limits may be determined for agents 230 in a simultaneous or overlapping manner.

As described above, parameters may include a variety of types of information associated with a given agent. In some embodiments, parameters may include response times and/or quality-of-service connections between respective agents and other computer systems. In other embodiments, parameters may include information about respective users, such as location (e.g., home address), occupation, age, credit score, and the like. Information associated with a user that is not strictly a numeric value, may be converted into a numeric value for use with the function of resource limit. For example, addresses may be simplified to postal codes or converted to latitude/longitude values. Various occupations may be mapped to particular values, such that different occupations with similar characteristics are mapped to similar values.

The parameter sets for each agent may be stored in database 110, along with the current resource limit. Computer system 101 may scan database 110 to identify agents 230 to be included in the subset. Such a technique may provide for dynamic groupings of agents 230 rather than assigning predetermined static groupings of the various agents 230. For example, a static grouping may result in agent 230*b* being included in a group that includes agents 230*a* and 230*c*, but excludes agent 230*d* which, as depicted, has parameter values that are closer to agent 230*b* than the either agent 230*a* or 230*c*. Using a dynamic grouping, rather than a static grouping, if a resource limit for agent 230*b* is updated, then the resource limit for agent 230*d* may be included in a selected subset of agents 230 and the corresponding resource limit updated, potentially providing more accurate resource limits than is static groups were used.

To update corresponding resource limits for the subset of agents 230, computer system 101 may be further configured to include weighed updates based on amounts of the particular deltas of respective parameter values between respective parameter values of subset of agents 230 and corresponding parameter values of agent 230*a*. For example, agent 230*c* is depicted as having parameter values that are closer to agent 230*a* than agent 230*b*. Accordingly, changes in the resource limit for agent 230*a* may have a greater impact to the resource limit of agent 230*c* than to the resource limit of agent 230*b*. Assume that the resource limit of agent 230*a* changes by 15%. This 15% change may be weighted by a factor of 0.5 when determining an updated resource limit for agent 230*c*, and weighted by a factor of 0.1 when determining an updated resource limit for agent 230*b*.

It is noted that FIG. 2 is one example of how parameter values may be used to select subsets of a plurality of agents when updating a database of resource limits. As shown, three parameters are shown. In other embodiments, any suitable number of parameters may be included in a given set of parameters for a respective agent.

The techniques described above describe use of a function of resource limit, the resource limit usable to predict a result of an information exchange. Such functions and predictions may be implemented in a variety of manners. An example of a respective function of resource limit and prediction results is shown in FIG. 3.

Turning to FIG. 3, two charts are illustrated that depict relationships between parameters, resource limits, and predictions. Chart 300 shows function of resource limit 330 in terms of a particular parameter value (parameter 305). Function of resource limit 330 is shown in terms of a single parameter 305 for simplicity. In other embodiments, a plurality of parameters may be included as inputs to function of resource limit 330, resulting in a multidimensional function rather than the two-dimensional chart 300. Chart 350 illustrates a several functions (binary function 370 and sigmoid functions 380a and 380b) that may be used for generating predicted result 360 for a particular type of information exchange.

As illustrated, chart 300 depicts function of resource limit 330 that produces, based on a respective input of parameter 305, a particular value of a net loss 315 from approved information exchanges, some of which may be successful and some which may fail. Losses may be in terms of wasted computing bandwidth or of monetary value depending on the type of information exchanges being performed. As described above, function of resource limit 330 may take a plurality of parameter values as inputs to produce a loss 315. Chart 300, therefore, may represent one instance of function of resource limit 330 with other parameter values entered as fixed values. Creation of function of resource limit 330 may be based on a plurality of parameters that are associated with execution of an information exchange. These parameters may be grouped into various datasets such as parameters associated with the information exchange itself (fundamental parameters), parameters associated with a history of the agent requesting the information exchange (historical parameters), and parameters associated with the information exchange checkpoints (checkpoint parameters).

For example, in a memory exchange in which a requesting agent requests information stored in a memory circuit, fundamental parameters may include information such as an amount of data requested, location of the stored data, a QoS for the exchange, and the like. Historical parameters may include, for example, amounts of data requested by the agent in previous memory exchanges source locations for the previously requested exchanges, total times for completing the previous exchanges, and so forth. Checkpoint parameters may include, e.g., current exchanges associated with the agent or the memory circuit that have not completed, traffic on one or more buses in a communication path between the agent and the memory circuit and the like.

As a different example, the requested exchange may be a financial transaction between a first agent and a second agent. In such an example, fundamental parameters may include, for example, an amount charged by the second agent, a source of funding for the first agent, a date of the exchange, etc. Historical parameters may include information such as a values of previous exchanges for the first and second agents, dates of the prior exchanges, indications of previous failed exchanges, and so forth. Checkpoint parameters may include, e.g., values of current exchanges for the first agent, risk indications asserted for either the first or second agent, and the like.

Fundamental parameters, generally speaking, should provide a similar amount of data for each requested information exchange, regardless of the requesting agent. Historical and checkpoint parameters, however, may vary significantly between different agents. Accordingly, function of resource limit 330 may be generated to provide a method for modelling information exchanges that may then be used to predict success of future information exchanges. In some embodiments, function of resource limit 330 may be implemented as a neural network with parameters included as input to the network. In such embodiments, parameters may be normalized to binary values, for example by comparing real number values to thresholds to produce true (1) and false (0) values. For example, a success or failure of each of a plurality of previous transactions may be included, along with other parameters associated with the previous transactions, as inputs to a neural network. After training of the neural network with this set of parameters from completed previous transactions, new values for a plurality of resource limits can be computed, including, for example, resource limit 320.

As stated above, resource limit 320 is used to predict a result of a given information exchange. In a simplest form, results may be predicted in a binary fashion, e.g., as successful (1) or failed (0), as depicted by binary function 370 in chart 350. Two respective functions may be used to represent successful and failed information exchanges.

$$T_{success}(t) = (1-y^i) \cdot a_t \quad (1)$$

$$T_{fail}(t) = (y^i) \cdot a_t \quad (2)$$

As shown in equations 1 and 2, T is a total value of an information exchange t, $y^i$ is '0' for a successful information exchange and '1' for a failed information exchange, and $a_t$ is a value of the information exchange t. Using equations 1 and 2, a single function may be established for determining net loss due to failed information exchanges.

$$f(v) = \Sigma_{t \in \tau}[T_{fail}(t) - \lambda T_{success}(t)] \quad (3)$$

$$f(v) = \Sigma_{t \in \tau} a_t 1_{\{m_t \leq v_{ct}\}}(y^{(it)}(1+\lambda) - \lambda) \quad (4)$$

Equation 3 may be used to determine a net loss for all information exchanges t, performed by a given agent ct, that are an element of a set of previously completed information exchanges τ, where v is a vector of resource limits associated with a corresponding agent ct, and λ, is regularization hyperparameter characterizing a trade-off between maximizing successful information exchanges while minimizing failed information exchanges. Substituting equations 1 and 2 into equation 3, equation 4 is realized, where $m_t$ represents respective features from information exchanges t, such that if $m_t \leq v_{ct}$, then a corresponding information exchange is approved, whereas if $m_t > v_{ct}$, then that information exchange would be denied. Accordingly, a value of $v_{ct}$ is desired that minimizes f(v). Use of a threshold value to make the approve/decline determination, however, results in binary function 370.

A gradient algorithm may be used for determining a resource limit $v_{ct}$. Gradient algorithms include gradient descents, used for identifying local minima by following a steepest downward path of a multidimensional surface, and gradient ascents, used to identify local maxima by following a steepest upward path. A local minima (maxima) is identified when all paths from an identified point result in a rising (falling) value of the surface. However, a gradient algorithm cannot work with a binary function that has no change in gradient. A binary function can, however, be approximated by substituting a sigmoid function.

$$f(v)=\Sigma_{t\in \tau}a_t\cdot\sigma(\alpha(v_{ct}-m_t))(y^{(ti)}(1+\lambda)-\lambda) \quad (5)$$

As shown, σ denotes the sigmoid function and α represents an approximation factor. A larger value of α corresponds to a closer approximation to binary function 370. For example, a first value of α corresponds to sigmoid function 380a while a second value of α, greater than the first value, corresponds to sigmoid function 380b. It is noted that sigmoid function 380b produces results that are closer to binary function 370 than sigmoid function 380a. Various factors may be utilized for determining a suitable value of α to use in equation 5. For example, a maximum value of the slope of sigmoid function 380b may be higher than desired for determining values of resource limit 320, and therefore, sigmoid function 380a may be preferred in some embodiments. In some embodiments, an iterative process may be implemented for determining a suitable value of α that provides a balance between accurately representing the binary function 370 and providing adequate slope for performing a gradient operation.

Equation 5, as shown, produces an independent value for a given agent based on information exchange history for the given agent. If, however, the given agent does not have a sufficient number of information exchanges in their history, then equation 5 will not produce much change in gradient, thereby making a gradient descent algorithm less effective at determining a suitable resource limit 320. To mitigate this limitation, an information exchange history for agents with sufficient similarity to the given agent may be utilized. The following equation illustrates one technique for quantifying a relative similarity between two agents.

$$D' = I + \frac{\min_{i\neq j}(d_{ij})}{\beta D} \quad (6)$$

In equation 6, D is a matrix in which a given element is a distances $d_{ij}$ between features of an agent i and an agent j in a given feature space. Accordingly, $\min_{i\neq j}(d_{ij})$ represents the distance between agent j and its closest neighboring agents. As used herein, a "feature space" refers to a collection of parameters associated with a set of agents that can be quantified and compared numerically. For example, parameters 205, 210, and 215 from FIG. 2 may be considered a feature space, and a distance $d_{ac}$ is the distance between respective parameters of agent 230a and agent 230c. I is the identity matrix and β is a hyperparameter for scaling matrix D. A value for β may be selected to normalize elements in D' to a particular value range. If distances between features of agents are too close, however, then computation of a normalized distance D' may result in small values in the denominator, thereby resulting in large values of D' which, in turn, may complicate the computations, for example, leading to numerical instability. To avoid such cases, an alternative to equation 6 may be used.

$$D' = \beta\frac{\max_{i,j}(d_{ij}) - D}{\max_{i,j}(d_{ij}) - \min_{i,j}(d_{ij})} \quad (7)$$

As depicted in equation 7, the normalized distance D' is based on determined maximum and minimum distances between common elements for agents i and j. The hyperparameter β is again used to normalize elements in D' to a particular value range. To avoid maximum distances that may tend to result in values of D' that approach either '0' or a maximum desired value, a subset of agents may be selected in which the subset includes agents that have maximum distances that are less than a threshold value.

Equation 5, it is noted, is based on an information exchange history $y^i$. As stated above, additional parameters associated with a given agent may be included in the determination of a respective resource limit. A quantization of such parameters may be added to equation 5.

$$f(v)=\Sigma_{t\in\tau}[a_t\cdot\sigma(a(v_{ct}-m_t))(y^{(ti)}(1+\lambda)-\lambda)+\Sigma_{k\in F}\mu_k\cdot x_t^{(k)}\cdot R_k\cdot v_{ct}] \quad (8)$$

In equation 8, a summation of weighted features is added to equation 5. For each feature k within a feature set F, a feature value $x_t$ is combined with a weight value $\mu_k$ and a correlation factor $R_k$. These combined values are summed across the feature set F and added to equation 5. Inclusion of these features k in equation 8 may increase an accuracy of the determination of resource limits, especially in cases in which a limited amount of information exchange history is available. To determine whether an adjustment is to be made to an existing resource limit 320 for a particular agent, a gradient descent algorithm is applied to equation 8 to identify an extreme value. In the current example, where f(v) represents a loss, the extrema point corresponds to a minima point to identify a point with a minimum loss. The gradient descent operation may be iterated over all agents for which historical information is available, as described above. Modifications to resource limit 320 during the iterations are performed following the following rule.

$$\delta'v=D'\times\delta v \quad (9)$$

Equation 9 illustrates that a partial derivative for resource limit v is weighted based on the normalized distance D'. Accordingly, the extrema point for a given agent may be identified based on a weighting factor that utilizes normalized distances to similar agents.

Returning to chart 300, three local extrema points 340 are included in the function of resource limit 330. Two of local extrema points 340 represent local minima points in which resource limit 320 increases when a value of parameter 305 is incrementally increased or decreased. The third local extrema point 340 is a local maxima point in which resource limit 320 decreases when a value of parameter 305 is incrementally increased or decreased.

As described above, determining a particular extrema point 340 of function of resource limit 330 includes performing a gradient descent operation over a set of completed requests (e.g., information exchanges). Based on one or more gradients determined from the gradient decent operation, a determination is made whether to increase or decrease the updated resource limit 320 from a current resource limit. For example, if an identified gradient for resource limit 320 is positive, then an updated resource limit 320 may be reduced, and vice versa.

It is noted that the example charts of FIG. 3 are merely examples to demonstrate various embodiments of the disclosed concepts. The disclosed examples are not intended to be limiting, and examples of additional embodiments may include different elements. For example, the disclosed embodiments include a function of resource limit that determines a loss. In other embodiments, a function of resource limit may be used that determines a gain. Equations 1-9 are examples of how the disclosed techniques may be implemented. Different equations may be used in other embodiments.

FIGS. 1-3 describe performing updates to a resource limit. Various procedures may be used for performing such updates. An example procedure is depicted in FIG. 4.

Figure 4:
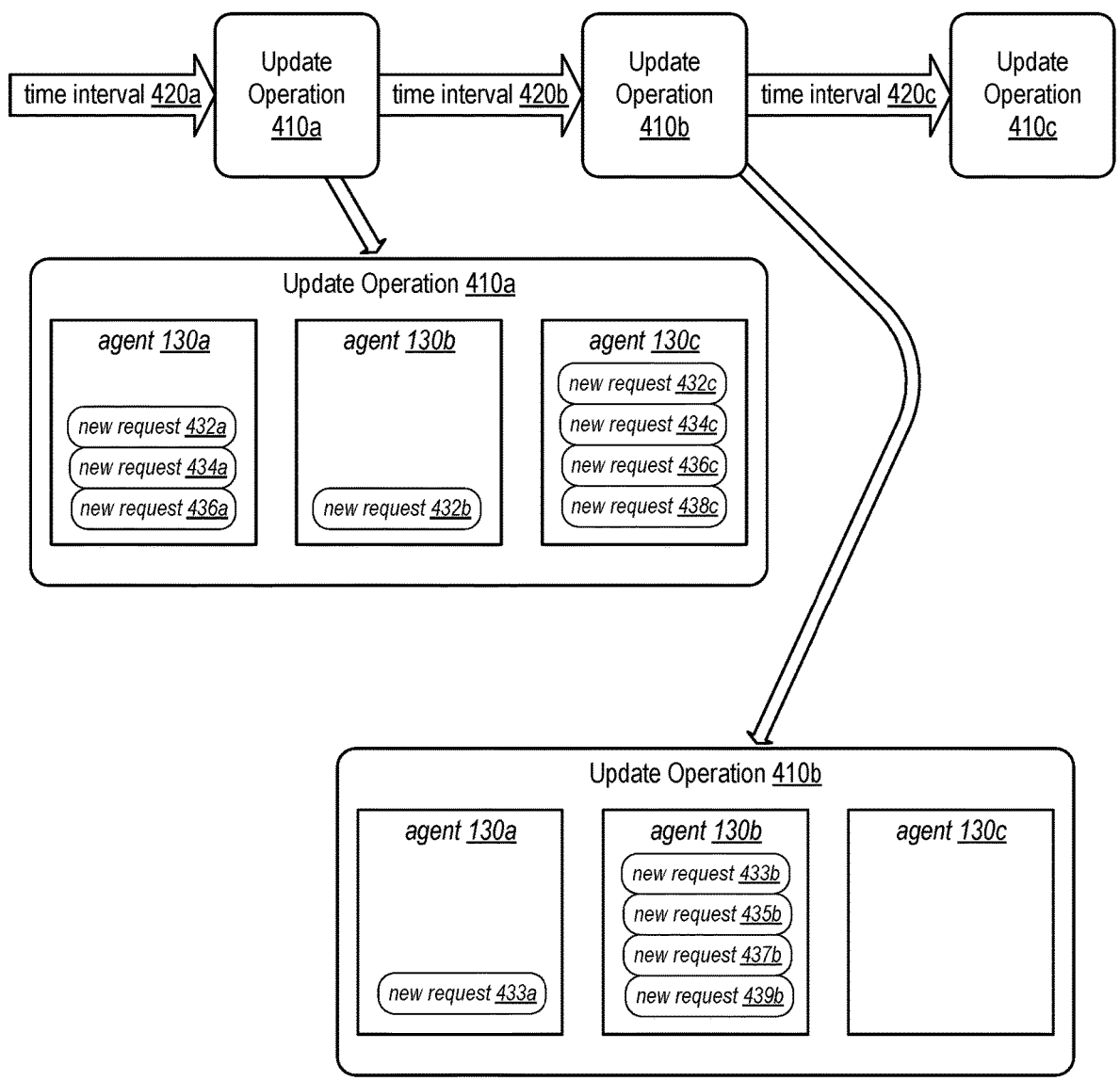
FIG. 4 illustrates a timing diagram depicting an order of update operations performed in conjunction with the disclosed techniques.

Moving now to FIG. 4, a flow diagram depicting a series of update operations is shown. As illustrated, flow diagram 400 includes update operations 410a-410c (collectively update operations 410) being performed at a time interval 420 (each interval labeled as 420a-420c). For update operations 410a and 410b, a status of agents 130 from FIG. 1 is shown, the status indicating a number of new requests that have been generated by each agent since a previous update operation 410.

As shown, a database of resource limits (e.g., database 110 in FIG. 1) is updated based on a determination that a particular time interval 420 has elapsed. A scheduling process may run in the background of computer system 101. After a determination has been made that time interval 420a has elapsed, this scheduling process causes update operation 410a to be performed. In some embodiments, time intervals 420 may depict an interval of time since a prior update operation 410 started or completed. Such an interval may be any suitable amount of time, such as one hour, one day, two weeks, and the like. In other embodiments, time intervals 420 may be based on a particular time of day, day of the week or month, or a combination thereof. For example, an update operation may be scheduled to be performed on the first and fifteenth of each month, or every Sunday at 1:00 AM. Selection of a suitable time interval may be based on an amount of time and processing bandwidth typically used to perform a given update.

When update operation 410a is performed, a subset of resource limits 120 in database 110 may be selected based on a status of the corresponding agent of agents 130. As illustrated, a current status of ones of agents 130 includes a determination of how many new requests a respective one of agents 130 has initiated since a prior update operation. At the time update operation 410a is performed, agent 130a has initiated three new requests (new requests 432a, 434a, and 436a), agent 130b has initiated one (new request 432b), and agent 130c has initiated three new requests (new requests 432c, 434c, 436c, and 438c). New requests may include requests to perform respective information exchanges with a second agent or other entity. The new requests may include information such as an amount of bytes in requested documentation or media, a purchase amount, a total allotment (e.g., a bandwidth limit for transferred byte), a timeframe for completing the request, and the like. In some embodiments, update operations 410a, 410b, and 410c may only consider new requests that have been completed and, therefore, have a known result regarding the successful/failed completion of the respective request.

For example, an updated resource limit 120a may be determined for agent 130a in response to determining that a number of requests (three) from agent 130a has incremented by a threshold number of requests since a previous update. If the threshold is two or three requests, then resource limits 120a and 120c are selected while resource limit 120b (associated with agent 130b with a single new request 432b) may not be updated initially. Updated resource limits 120a and 120c are determined, individually, using the technique described above. After updated values of resource limits 120a and 120c are determined, then if agent 130b is within a threshold distance of agent 130a and/or 130c, then resource limit 120b may still be updated using the update resource limit(s) of the close agents.

After update operation 410a completes and time interval 420b elapses, update operation 410b may be performed.

Based on the status of agents 130, resource limit 120b may be selected for an update based on a determination that the four new requests 433b, 435b, 437b, and 439b exceed the threshold number of new requests. Agent 130a and 130c, however, have one new request (new request 433a) and zero new requests, respectively. Accordingly, new values for resource limits 120a and 120c may not be updated initially. After (or in parallel) the updated value of resource limit 120b is determined, then resource limits 120a and/or 120c may be further updated if the distance of agent 130a and/or 130c, respectively, are within a threshold distance of agent 130b.

This update technique may continue to repeat. After time interval 420c elapses, update operation 410c is performed. A status for each of agents 130, including a number of respective new requests that have been initiated and/or completed during time interval 420c is determined and appropriate resource limits are updated.

It is noted that flow diagram 400 merely demonstrates one procedure for scheduling update operations based on the disclosed techniques, and is not intended to be limiting. Although only three update operations are shown, such a procedure may continue indefinitely as long as system 100 is in operation. For the sake of clarity, a limited number of agents and new requests are depicted. In other embodiments, threshold limits for determining whether to update a given resource limit may be set to any suitable value, including tens, hundreds, or even thousands of new requests.

FIGS. 1-4 describe various techniques for maintaining and updating a database of resource limits for predicting outcomes of requests from a plurality of agents. Such techniques may be implemented using a variety of methods. FIGS. 5-7 describe three such methods.

Proceeding now to FIG. 5, a flow diagram of an embodiment of a method for maintaining a database of resource limits and using the resource limits to predict a result of a request is depicted. In some embodiments, method 500 may be performed by computer system 101 in FIG. 1, to predict an outcome of a request. For example, computer system 101 may include (or have access to) a non-transitory, computer-readable medium having program instructions stored thereon that are executable by computer system 101 to cause the operations described with reference to FIG. 5. Referring collectively to FIGS. 1 and 5, method 500 begins in block 510.

At block 510, method 500 includes maintaining, by computer system 101, database 110 of resource limits 120 for a plurality of agents 130. As described above, a corresponding resource limit 120 for a given agent of agents 130 is usable for predicting a result of a given request from the given agent of agents 130. Resource limits 120 may, for example, provide a resource limit for a respective one of agents of agents 130. As part of the maintenance of database 110, computer system 101 may update, at various points in time, one or more of resource limits 120. Additional details for maintaining database 110 are provided below in the description of FIG. 6. Limited resources of a given agent of agents 130 may impact a probability of an agent of agents 130 successfully completing a respective request. For example, agent 130a may be a computer device operated by a particular user. The user may request completion of an information exchange with a third party via a processing system in which computer system 101 is included. Resource limit 120a, in such an example, may be an estimation of the user's resources for satisfying terms of the requested information exchange by agent 130a.

Method 500 further includes at block 520 receiving, by computer system 101, a request from a particular agent of agents 130 (e.g., agent 130*a*). As described in regard to block 510, agent 130*a* may send a request that is received by computer system 101, the request including an information exchange between agent 130*a* and the third party. In some embodiments, the requested information exchange may be an acquisition by agent 130*a* of goods or services from the third party. In such a case, resource limit 120*a* may estimate a spending limit for agent 130*a*. In other embodiments, the requested information exchange may be a request for streaming content from the third party. In this example, resource limit 120*a* may be an estimation of download bandwidth available for agent 130*a*.

Method 500 at block 530 also includes predicting, using an updated resource limit 120*a* from database 110, a result of the request. Computer system 101, as illustrated, may use a most recent updated value of resource limit 120*a* to predict a result of the requested information exchange. In the spending limit example, updated resource limit 120*a* would be a most recent estimate of an ability of agent 130*a* to fund an acquisition, and resource limit 120*a* would be compared to a value included in the requested information exchange. In the bandwidth example, resource limit 120*a* would be a latest estimate of download bandwidth available to agent 130*a*. Resource limit 120*a* would be compared to a size of the requested media.

It is noted that the method of FIG. 5 includes elements 510-530. Method 500 may end in block 530 or may repeat some or all of blocks 510-530. For example, method 500 may return to block 510 to continue maintenance of database 110. In some cases, method 500 may be performed concurrently with other instantiations of the method. For example, two or more cores, or process threads in a single core, in computer system 101 may each perform method 500 independently from one another.

Moving to FIG. 6, a flow diagram of an embodiment of a method for updating resource limits in a database is depicted. In a similar manner as method 500, method 600 may be performed by a computer system such as computer system 101 in FIG. 1. The computing device may, for example, include (or have access to) a non-transitory, computer-readable medium having program instructions stored thereon that are executable by the computer system to cause the operations described with reference to FIG. 6. In some embodiments, method 600 may correspond to actions that occur as a part of block 510 in method 500. Referring collectively to FIGS. 1 and 6, method 600 begins in block 610.

Block 610 of method 600 includes determining an updated resource limit 120 for a particular agent of agents 130 (e.g., agent 130*b*) based on identifying, over a set of completed requests for agent 130*b*, an extrema point of resource limit function 115. As illustrated, resource limit function 115 is based on a current resource limit 120*b* for agent 130*b* and a current state of active requests (132*b*, 134*b*, and 136*b*) for agent 130*b*. Computer system 101 may be configured to, at various points in time, such as at a particular time interval 420 as shown in FIG. 4, update one or more resource limits 120 in database 110. To update resource limit 120*b*, computer system 101 may be further configured to use a gradient descent method to identify a local minima point of resource limit function 115. Such a local minima point may indicate a value of resource limit 120*b* that corresponds to reduced risk of an undesired outcome of a request from agent 130*b*. Accordingly, a difference between a value of resource limit 120*b* associated with the identified local minima point and a current value of resource limit 120*b* may be used to adjust resource limit 120*b*.

At block 620, method 600 includes updating database 110 using the updated resource limit 120*b*. After resource limit 120*b* has been updated, computer system 101 may be configured to store the updated resource limit 120*b* back into database 110. Accordingly, database 110 maintains current resource limits 120 to improve accuracies of predictions made by computer system 101.

Method 600 also includes at block 630, selecting, from database 110, a subset of agents 130. Computer system 101 may be configured to select certain agents from agents 130 that have associated parameter values (e.g., parameter values for parameters 205, 210, and 215 in FIG. 2) that are within a particular delta of the parameter values associated with agent 130*b*. For example, agents 130 of the selected subset may have one or more similarities with agent 130*b*. Assuming that agents 130 with similar properties may have similar probabilities of success or failure with similar requests, using newly updated resource limit 120*b* to update resource limits 120 of similar agents of agents 130 may increase an accuracy of future predictions made by computer system 101. In some embodiments, updating the corresponding resource limits 120 for the subset of agents 130 includes weighting updates based on magnitudes of differences between respective parameter values of the subset of agents 130 and corresponding parameter values of agent 130*b*. Updated resource limit 120*b* may be weighted more heavily when updating resource limits 120 of agents 130 that are more similar to agent 130*b*. When updating resource limits 120 of agents 130 of the subset that have fewer similarities to agent 130*b*, a lower weighting may be used.

In addition, method 600 includes, at block 640, updating, in database 110, corresponding resource limits 120 for the subset of agents 130 based on the updated resource limit 120*b*. After the subset of resource limits 120 has been updated, computer system 101 further stores the updated resource limits 120 in database 110, thereby maintaining current resource limits 120. Updating resource limits 120 of other agents of agents 130 that have some similarities to agent 130*b* may increase an accuracy of predictions made by computer system 101. In particular, some agents of agents 130 may not have a large number of previous requests from which to determine their respective resource limits 120.

It is noted that the method of FIG. 6 includes elements 610-640. Method 600 may end in block 640. In other embodiments, the operations of method 600 may be repeated for every one of the resource limits 120 that is selected for updating in a given update operation. In a similar manner as method 500, different instances of method 600 may be performed by one or more processor cores in the computer system to update multiple resource limits concurrently. Method 600 may be performed concurrently with method 500 and/or as a portion of method 500, such as block 510.

Turning to FIG. 7, a flow diagram of another embodiment of a method for updating resource limits in a database is illustrated. Similar to methods 500 and 600, method 700 may be performed by a computer system such as computer system 101 in FIG. 1. For example, the computing device may include (or have access to) a non-transitory, computer-readable medium having program instructions stored thereon that are executable by the computer system to cause the operations described with reference to FIG. 7. Referring collectively to FIGS. 1 and 7, method 700 begins in block 710.

Method 700 includes at block 710 maintaining, by computer system 101, database 110 of resource limits 120 for agents 130. A corresponding one of the resource limits 120 for a given agent of agents 130 is, as described above, usable for predicting a result of a given request from the given agent of agents 130. Maintaining database 110 includes, for example, updating stored resource limits 120 as more information is available for improving an accuracy of resource limits 120. Resource limits 120 may be estimated based on information related to the given agent of agents 130 at the time the resource limit is determined. At later points in time, additional information related to the given agent of agents 130 may be available, allowing the respective one of resource limits 120 to be updated to a more accurate value. In various embodiments, an update operation may be performed by computer system 101 at periodic time intervals and/or at particular times of day and dates.

At block 720, method 700 includes using, by computer system 101, resource limit function 115 to determine respective ones of resource limits 120 that are stored in database 110. During an update operation, resource limit function 115 may be used to determine if a given one of resource limits 120 (e.g., resource limit 120c) is to be updated. Resource limit function 115 may, for example, produce a value that is indicative of an undesired condition, such as an amount of loss of a resource. Accordingly, a lower value result from resource limit function 115 may be desired. In other embodiments, however, resource limit function 115 may produce a value that is indicative of an amount of gain of the resource, in which case, higher values from resource limit function 115 would be desired. Block 720 further includes two sub-operations, blocks 724 and 727, that describe how resource limit function 115 may be used in an update operation.

At block 724, method 700 includes performing a gradient operation (e.g., a descent or ascent operation) to identify, over a set of completed requests and active requests for a particular agent (e.g., agent 130c), an extrema point of resource limit function 115. As described above, resource limit function 115, to determine an output related to agent 130c, may depend on a history of requests of agent 130c. As more history for agent 130c is available, results from the additional history may be used to train resource limit function 115 to produce more accurate results in relation to agent 130c. This training may relocate extrema points produced by resource limit function 115. Extrema points may provide an indication of a set of inputs that produce more desirable results. For example, if resource limit function 115 is a loss function (e.g., an undesired result) then identifying a minima point may indicate input values associated with reducing the undesired result. Conversely, identifying a maxima point in a resource limit function 115 that is a gain function may indicate input values associated with increasing a desired result.

In addition to using request history for agent 130c, determining the extrema point for agent 130c may further comprise including, in resource limit function 115, respective penalties associated with a plurality of features associated with agent 130c. Such features may correspond to characteristics of agent 130c. For example, if agent 130c corresponds to a user, then characteristics may include age, occupation, nationality, residence, and the like. These features may allow different agents of agents 130 to be associated based on commonalities related to success or failure of their respective requests. If two different agents have similar features and have similar results for their requests, then their respective request histories may be used when updating each other's resource limits 120.

Method 700 further includes at block 727 determining, based on the extrema point, an adjustment to resource limit 120c for agent 130c. Based on the extrema point determined from the gradient decent operation, a determination may be made whether to increase or decrease the adjusted resource limit from the current resource limit. For example, a minima point may be identified that corresponds to a particular set of input values including a particular value for resource limit 120c. If the particular value is less than the current value of resource limit 120c, then an adjusted value of resource limit 120c may be less than the current value. Conversely, if the particular value is greater than the current value, then the adjusted value may be increased from the current value of resource limit 120c. It is noted that the adjusted value may or may not be the particular value. In some embodiments, it may be desired to limit an amount of change made to a given resource limit 120 in a single update operation.

Method 700, at block 730, also includes predicting, by computer system 101 using adjusted resource limit 120c from database 110, a result of a request received from agent 130c. Agent 130c may send a request that is received by computer system 101, the request including an information exchange between agent 130c and a third party. In various embodiments, agent 130c may send the request directly to computer system 101 or the request may be relayed to computer system 101 via one or more other computer systems. The request includes a condition that agent 130c utilizes a particular amount of a limited resource in exchange for an item (a physical object, a media file, information, etc.). Computer system 101 utilizes the adjusted resource limit 120c to predict whether agent 130c has sufficient resources for completing the exchange.

The method of FIG. 7, it is noted, includes elements 710-730. In various embodiments, method 700 may end in block 730, or at least some operations of method 700 may be repeated. For example, method 700 may return to block 710 as part of maintenance of database 110. In a similar manner as methods 500 and 600, different instances of method 700 may be performed in the computer system to concurrently update multiple resource limits.

Figure 8:
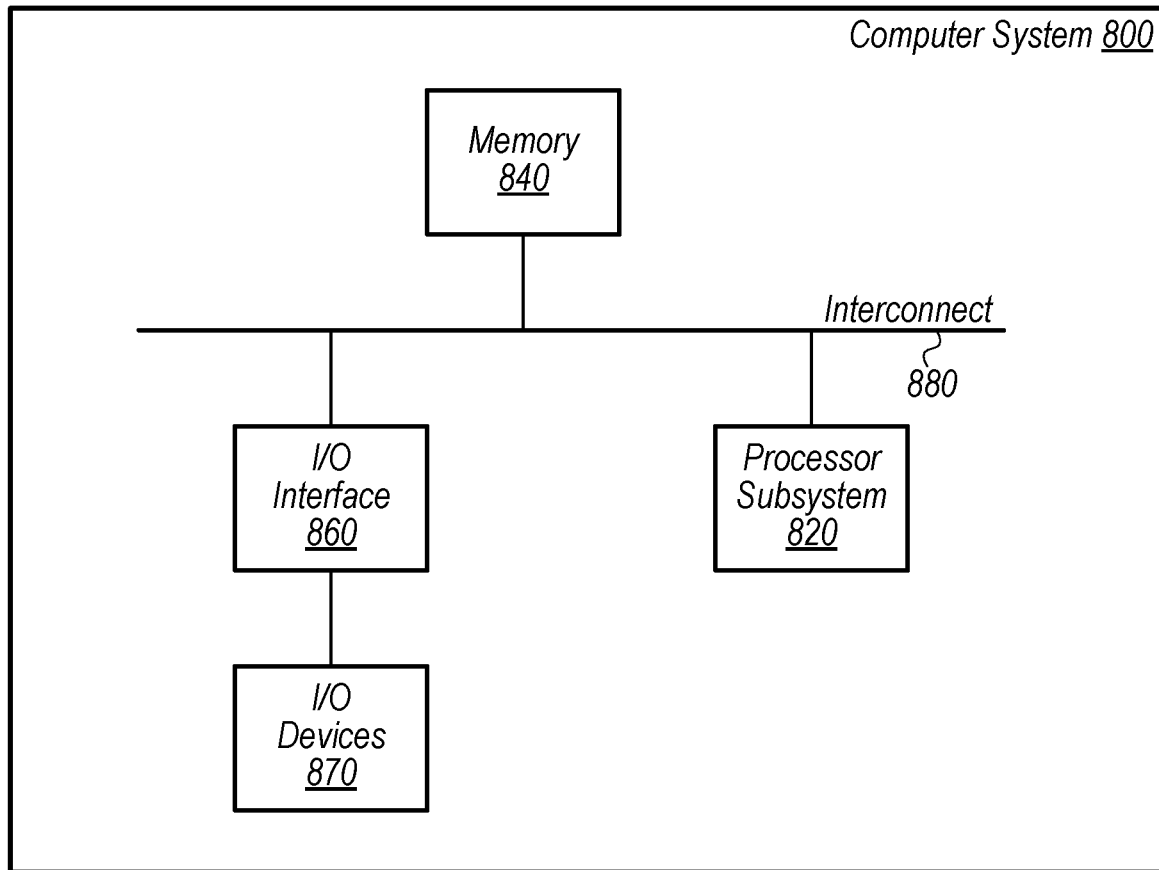
FIG. 8 is a block diagram illustrating an example computer system, according to some embodiments.

In the descriptions of FIGS. 1-7, various a computer system for implementing the disclosed techniques has been disclosed, as well as computer systems associated with the various agents. Computer systems may be implemented in a variety of manners. FIG. 8 provides an example of a computer system that may correspond to one or more of the disclosed systems.

Referring now to FIG. 8, a block diagram of an example computer system 800 is depicted. Computer system 800 may, in various embodiments, implement one or more of the disclosed computer systems, such as computer system 101 and/or agents 130 in FIG. 1. Computer system 800 includes a processor subsystem 820 that is coupled to a system memory 840 and I/O interfaces(s) 860 via an interconnect 880 (e.g., a system bus). I/O interface(s) 860 is coupled to one or more I/O devices 870. Computer system 800 may be any of various types of devices, including, but not limited to, a server computer system, personal computer system, desktop computer, laptop or notebook computer, mainframe computer system, server computer system operating in a datacenter facility, tablet computer, handheld computer, smartphone, workstation, network computer, connected vehicle, etc. Although a single computer system 800 is shown in FIG. 8 for convenience, computer system 800 may also be implemented as two or more computer systems operating together.

Processor subsystem 820 may include one or more processors or processing units. In various embodiments of computer system 800, multiple instances of processor subsystem 820 may be coupled to interconnect 880. In various embodiments, processor subsystem 820 (or each processor unit within 820) may contain a cache or other form of on-board memory.

System memory 840 is usable to store program instructions executable by processor subsystem 820 to cause computer system 800 perform various operations described herein. System memory 840 may be implemented using different physical, non-transitory, computer-readable media, such as hard disk storage, floppy disk storage, removable disk storage, flash memory, random access memory (RAM-SRAM, EDO RAM, SDRAM, DDR SDRAM, LPDDR SDRAM, etc.), read-only memory (PROM, EEPROM, etc.), and so on. Memory in computer system 800 is not limited to primary storage such as system memory 840. Rather, computer system 800 may also include other forms of storage such as cache memory in processor subsystem 820 and secondary storage in I/O devices 870 (e.g., a hard drive, storage array, etc.). In some embodiments, these other forms of storage may also store program instructions executable by processor subsystem 820.

I/O interfaces 860 may be any of various types of interfaces configured to couple to and communicate with other devices, according to various embodiments. In one embodiment, I/O interface 860 is a bridge chip (e.g., Southbridge) from a front-side to one or more back-side buses. I/O interfaces 860 may be coupled to one or more I/O devices 870 via one or more corresponding buses or other interfaces. Examples of I/O devices 870 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 870 includes a network interface device (e.g., configured to communicate over Wi-Fi®, Bluetooth®, Ethernet, etc.), and computer system 800 is coupled to a network via the network interface device.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method executed by a computer system comprising:

storing resource limits for a plurality of agents in a database, wherein a corresponding resource limit for a given agent is usable for predicting a result of a given request from the given agent;

training a resource limit function that utilizes a neural network using a dataset of one or more parameters associated with previously completed requests by the plurality of agents, wherein the resource limit function is based on a current resource limit for the given agent and a current state of active requests for the given agent;

updating the database using an updated resource limit for the given agent based on an extrema point of the trained resource limit function;

updating, in the database, corresponding resource limits for a subset of the plurality of agents based on the updated resource limit, wherein the subset of the plurality of agents have associated parameter values that are within a particular delta of parameter values associated with the given agent;

receiving a request from the given agent; and performing the request in response to a predicted result of the request satisfying a particular threshold, wherein the predicted result is based on the updated resource limit stored in the database.

2. The method of claim 1, wherein the weighted updated corresponding resource limits for the subset of the plurality of agents are based on amounts of the particular deltas of the respective parameter values.

3. The method of claim 1, wherein the extrema point is based on a gradient operation on resource limit functions for the plurality of agents and a set of completed requests for the given agent.

4. The method of claim 3, wherein a difference between the updated resource limit and the current resource limit is based on a value of a gradient associated with the trained resource limit function.

5. The method of claim 1, wherein the resource limit function is further based on respective penalties associated with a plurality of features associated with the given agent.

6. The method of claim 5, wherein corresponding weights are associated with a plurality of the respective penalties.

7. The method of claim 1, wherein the resource limit function includes a sigmoid function that approximates a binary function.

8. The method of claim 1, wherein the database of resource limits is updated when a particular time interval has elapsed.

9. The method of claim 8, wherein a given updated resource limit for the given agent is based on a number of requests from the given agent increasing by a threshold number of requests since a previous update.

10. A non-transitory hardware computer-readable medium having instructions stored thereon that are executable by a computer system to perform operations comprising:
training, using previously completed requests by a plurality of agents, a neural network having a resource limit function;
storing an adjusted resource limit for a particular agent of the plurality of agents in a database, wherein the adjusted resource limit is based on an extrema point of the trained resource limit function and is usable for predicting a result of a given request from the particular agent, and wherein ones of the plurality of agents have associated parameter values;
updating, in the database, corresponding resource limits for a subset of the plurality of agents based on the adjusted resource limit, wherein the subset of agents have associated parameter values that are comparable to parameter values associated with the particular agent;
receiving a request from the particular agent; and
completing the request based on a predicted result of the request satisfying a particular threshold, wherein the predicted result is based on the adjusted resource limit stored in the database.

11. The non-transitory hardware computer-readable medium of claim 10, wherein weighted updated corresponding resource limits for the subset of agents are based on differences between respective parameter values of the subset of agents and corresponding parameter values of the particular agent.

12. The non-transitory hardware computer-readable medium of claim 10, wherein the resource limit function is further based on respective penalties associated with a plurality of features associated with the particular agent.

13. The non-transitory hardware computer-readable medium of claim 12, wherein weights are associated with a plurality of the respective penalties.

14. The non-transitory hardware computer-readable medium of claim 10, wherein the database is updated based on a particular time of day.

15. The non-transitory hardware computer-readable medium of claim 14, wherein a given resource limit is updated for a respective agent based on a number of requests from the respective agent increasing by a threshold number of requests since a previous update.

16. A method executed by a computer system comprising:
storing resource limits for a plurality of agents in a database, wherein a corresponding resource limit for a given agent is usable for predicting a result of a given request from the given agent;
training a resource limit function implemented as a neural network using a dataset of previously completed requests from the plurality of agents;
receiving a request from the given agent of the plurality of agents; and
denying the request in response to a predicted result of the request failing to satisfy a particular threshold, wherein the predicted result is based on an adjusted resource limit for the given agent stored in the database, wherein the adjusted resource limit is based on an extrema point of the trained resource limit function, and wherein the extrema point is based on a gradient operation over a set of completed requests and active requests for the given agent of the plurality of agents.

17. The method of claim 16, further comprising:
updating, in the database, corresponding resource limits for a subset of the plurality of agents based on the adjusted resource limit, wherein ones of the plurality of agents have associated parameter values.

18. The method of claim 16, wherein a modification of the adjusted resource limit is based on one or more values associated with the gradient operation.

19. The method of claim 16, wherein the extrema point for the given agent is further based on respective penalties associated with a plurality of features associated with the given agent.

20. The method of claim 19, wherein weights are associated with a plurality of the respective penalties.

* * * * *

UNITED STATES PATENT AND TRADEMARK OFFICE
CERTIFICATE OF CORRECTION

PATENT NO. : 12,271,759 B2  
APPLICATION NO. : 17/645696  
DATED : April 8, 2025  
INVENTOR(S) : Alban Axel Zammit et al.

Page 1 of 1

It is certified that error appears in the above-identified patent and that said Letters Patent is hereby corrected as shown below:

In the Claims

In Column 21 (Claim 2), Line 1, please delete "wherein the weighted updated" and insert -- wherein weighted updated --.

Signed and Sealed this  
Sixteenth Day of September, 2025

Coke Morgan Stewart  
*Acting Director of the United States Patent and Trademark Office*